US009162336B2

(12) United States Patent
    Sato

(10) Patent No.: US 9,162,336 B2
(45) Date of Patent: Oct. 20, 2015

(54) MACHINE TOOL PROVIED WITH TABLE HAVING WIPER FOR REMOVING CHIPS DEPOSITED ON MOVABLE COVER

(71) Applicant: FANUC Corporation, Yamanashi (JP)

(72) Inventor: Naoki Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 60 days.

(21) Appl. No.: 14/179,044

(22) Filed: Feb. 12, 2014

(65) Prior Publication Data

US 2014/0234045 A1    Aug. 21, 2014

(30) Foreign Application Priority Data

Feb. 21, 2013    (JP) .................................. 2013-032303

(51) Int. Cl.
    *B23Q 11/08*    (2006.01)
(52) U.S. Cl.
    CPC ........ *B23Q 11/0875* (2013.01); *B23Q 11/0825* (2013.01); *Y10T 409/30392* (2015.01); *Y10T 409/304032* (2015.01); *Y10T 409/304088* (2015.01)
(58) Field of Classification Search
    CPC ............. Y10T 409/30392; Y10T 409/304032; Y10T 409/304088; Y10T 409/304144; Y10T 408/46; Y10T 408/458; B23Q 11/0875; B23Q 11/08; B23Q 11/1076
    USPC ........................................... 160/223, 11, 202
    IPC ...................................................... B23Q 11/08
    See application file for complete search history.

(56) References Cited

U.S. PATENT DOCUMENTS

| 3,485,138 | A | * | 12/1969 | Staehle ......................... 409/137 |
| 4,950,113 | A | * | 8/1990 | Winkler et al. ............... 409/134 |
| 5,807,043 | A | * | 9/1998 | Blank ............................ 409/134 |
| 6,987,241 | B2 | * | 1/2006 | Hacker et al. ............ 219/121.86 |
| 7,302,987 | B2 | * | 12/2007 | Jung .............................. 160/222 |
| 7,341,092 | B2 | * | 3/2008 | O'Rourke et al. ............ 160/223 |

FOREIGN PATENT DOCUMENTS

| CN | 1899759 A | 1/2007 |
| DE | 9309861 U1 * | 11/1993 |
| DE | 10101038 A1 | 7/2002 |
| JP | 07060593 A * | 3/1995 |
| JP | 7-88741 A | 4/1995 |

(Continued)

OTHER PUBLICATIONS

Decision to Grant a Patent mailed Nov. 18, 2014, corresponding to Japanese patent application No. 2013-032303.

(Continued)

*Primary Examiner* — Daniel Howell
(74) *Attorney, Agent, or Firm* — Hauptman Ham, LLP

(57) ABSTRACT

The machine tool includes a saddle, a table which moves relative to the saddle, a telescopic cover fixed to the saddle, and a wiper fixed to the table. The telescopic cover protects a guide member which supports the saddle in such a manner as to be capable of moving with respect to the bed. When chips generated by the working of a workpiece placed on the table have deposited on the surface of the telescopic cover, the wiper fixed to the table removes the chips by the movement of the table and causes the chips to fall.

2 Claims, 4 Drawing Sheets

(56) References Cited

FOREIGN PATENT DOCUMENTS

| JP | 11-114769 | A | | 4/1999 |
|----|-----------|---|---|--------|
| JP | 11-277363 | A | | 10/1999 |
| JP | 2001-150291 | A | | 6/2001 |
| JP | 2006123053 | A | * | 5/2006 |
| JP | 2007-50501 | A | | 3/2007 |
| WO | 01/15853 | A1 | | 3/2001 |

OTHER PUBLICATIONS

Office Action dated Jun. 16, 2015, corresponding to Chinese patent application No. 201410060127.2.

* cited by examiner

MACHINE TOOL PROVIED WITH TABLE HAVING WIPER FOR REMOVING CHIPS DEPOSITED ON MOVABLE COVER

RELATED APPLICATIONS

The present application claims priority to Japanese Application Number 2013-032303, filed Feb. 21, 2013, the disclosure of which is hereby incorporated by reference herein in its entirety.

BACKGROUND OF THE INVENTION

1. Field of the Invention

The present invention relates to a machine tool provided with a wiper in a table on which a workpiece is placed as means for removing chips deposited on a movable cover.

2. Description of the Related Art

In a machine tool with a splash guard covering the working region in order to prevent chips generated during working from scattering to outside the machine tool, chips deposit on a telescopic cover fixed to a table and adhere to the surface of the telescopic cover. As disclosed in Japanese Patent Application Laid-Open No. 2001-150291, for example, as a conventional technique to cope with this situation, there is generally known a method in which a wiper is fixed to one of a plurality of members constituting a telescopic cover capable of expanding and contracting and the wiper is brought into contact with the surface of the telescopic over, whereby chips are removed in the longitudinal direction of the telescopic cover during the movement of the table. In addition, Japanese Patent Application Laid-Open No. 11-277363 discloses a method which involves scraping down chips deposited on telescopic covers in synchronization with the opening and closing of a door.

The technique disclosed in Japanese Patent Application Laid-Open No. 2001-150291 mentioned above has a problem of the accuracy of the machine tool being affected by the sliding resistance between the telescopic cover and the wiper when the table moves. In the technique disclosed in Japanese Patent Application Laid-Open No. 11-277363 mentioned above, chips deposited on a telescopic cover in front of a table are scraped down during the opening and closing of a door. Accordingly, when the working had taken time and the door had not been opened and closed for a long time, chips would continue to deposit, adversely affecting the action of the cover. However, no description is given of a solution to this. Furthermore, for the deposition of chips onto a telescopic cover at the rear of the table, how to cope with this is not taken into consideration.

SUMMARY OF THE INVENTION

In order to solve the problems with the conventional techniques, an object of the present invention is to provide a machine tool having a cover structure suitable for discharging chips generated by the use of the machine tool.

The machine tool of the present invention includes a saddle which is supported by a first guide member provided in a bed and moves relative to the bed in a first direction, and a table which is supported by a second support member provided in the saddle and moves relative to the saddle in a second direction intersecting the first direction, and moves a tool attached to a spindle relative to a workpiece placed on the table to work the workpiece. The machine tool further includes a telescopic movable cover which is provided in the saddle and protects the first guide member, and a wiper which is fixed to a side surface of the table in the first direction and removes chips deposited on the movable cover.

The machine tool may include a cutting fluid feeding channel which feeds a cutting fluid on the surface of the movable cover.

The present invention can provide a machine tool having a cover structure suitable for discharging chips generated by the use of the machine tool.

BRIEF DESCRIPTION OF THE DRAWINGS

The above-described and other objects and features of the present invention will be apparent from the description of an embodiment with reference to the accompanying drawings. In these drawings.

DETAILED DESCRIPTION OF THE PREFERRED EMBODIMENTS

Figure 2:
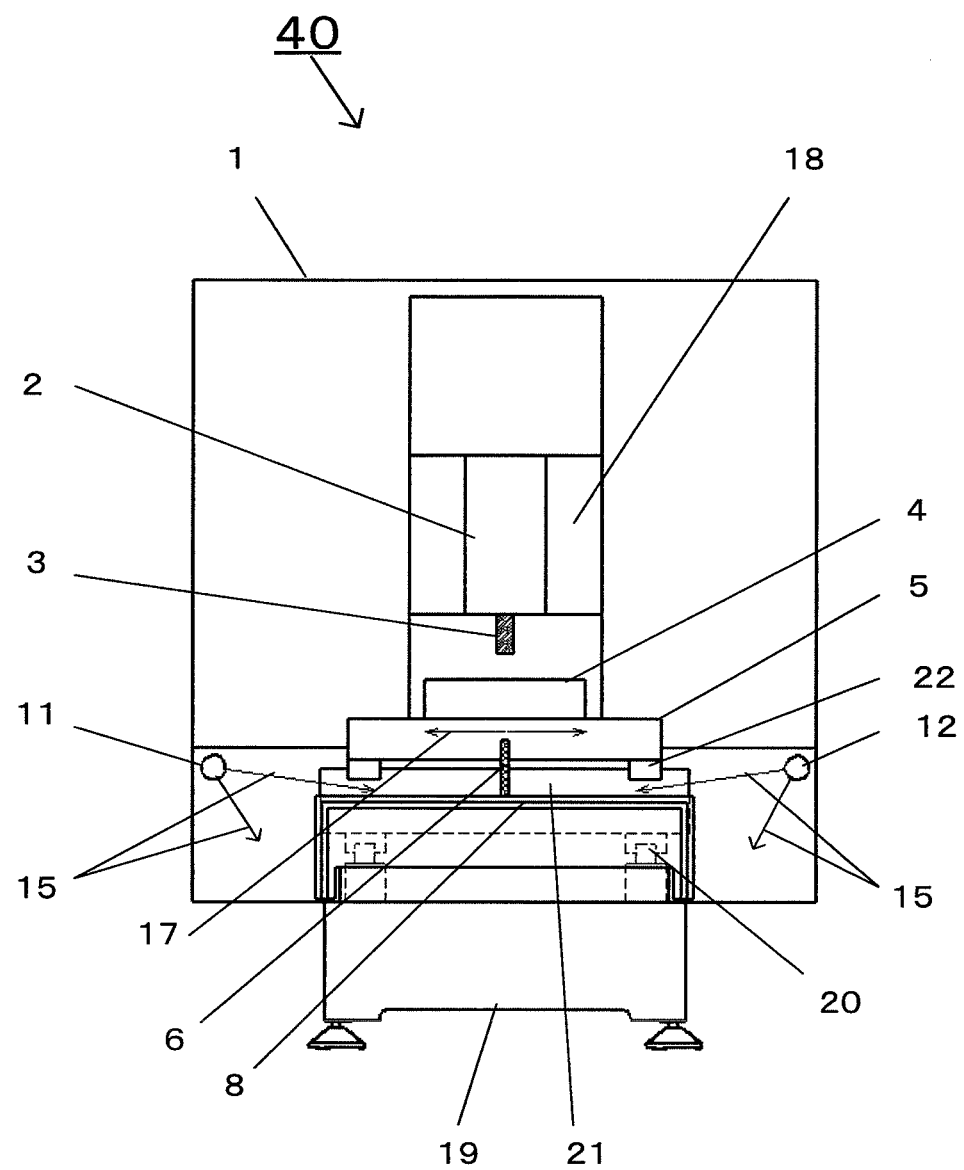
FIG. 2 is a schematic front view of the machine tool of FIG. 1.
Figure 3:
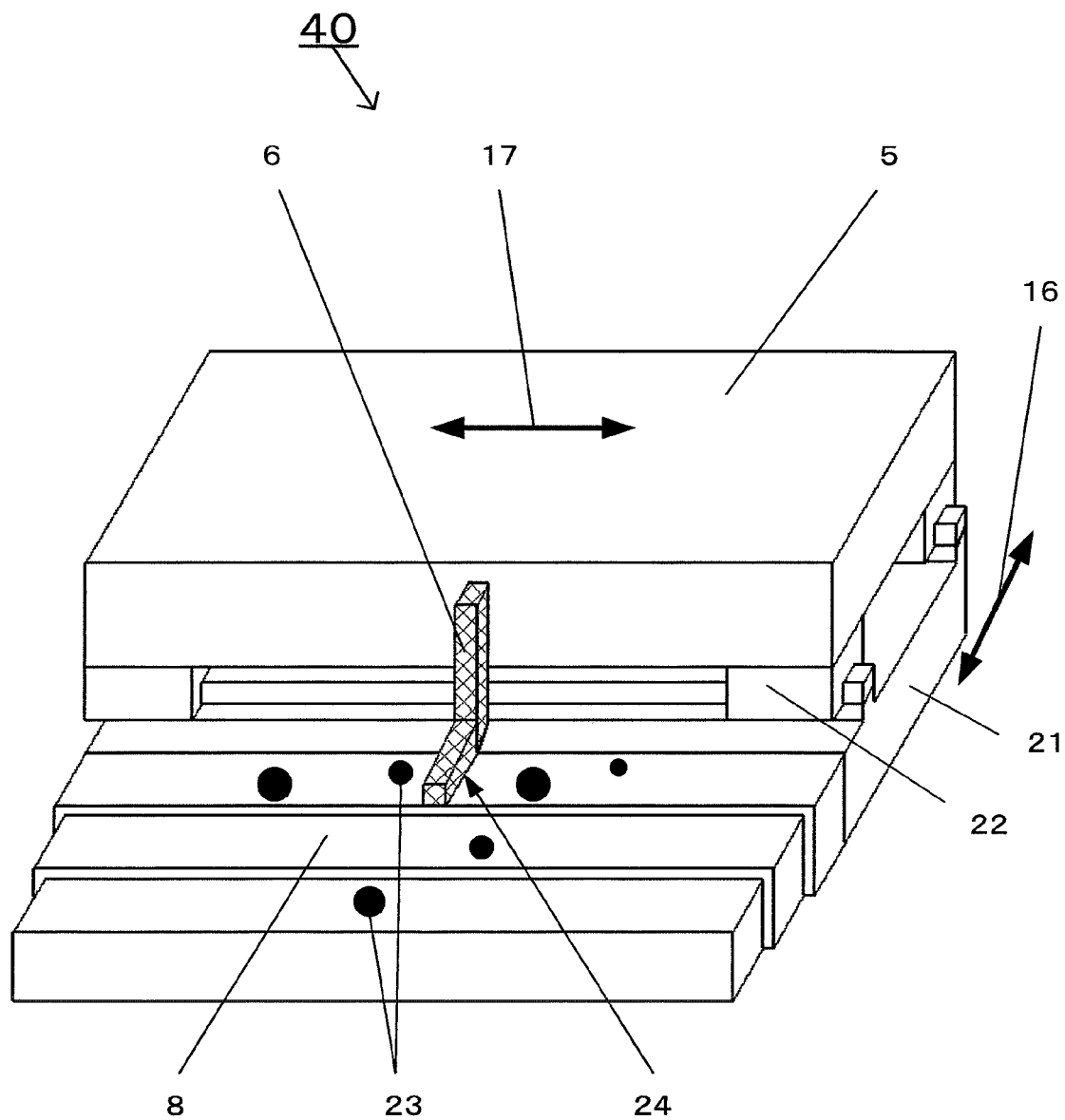
FIG. 3 is a diagram to explain the area in which a wiper is attached to a table.

As shown in FIG. 2, a saddle 21 is supported on a bed 19 via a saddle moving mechanism 20 and a table 5 is supported on the saddle 21 via a table moving mechanism 22. A workpiece 4 is placed on the table 5. Furthermore, a column 18 is provided in a standing manner on the bed 19 and a spindle 2 is fixed to an upper part of the column 18. A tool 3 is attached to the spindle 2. A machine tool 40 causes the spindle 2 and the table 5 to move relative to each other in a working space, thereby performing the cutting work on the workpiece 4 placed on the table 5. The saddle moving mechanism 20 and the table moving mechanism 22 are each composed of a rail and a guide guided by the rail. The moving direction (the second direction) of the table 5 is vertical to the moving direction (the first direction) of the saddle 21.

Chips 23 generated during the cutting work on the workpiece 4 adhere to surfaces of a first telescopic cover 7 and a second telescopic cover 8. Therefore, in order to prevent chips generated during the cutting work on the workpiece 4 from adhering to a rail and a guide constituting the table moving mechanism 22, as shown in FIG. 1, the first and second telescopic covers 7, 8 capable of expanding and contracting in the moving direction of the saddle 21 are attached to the saddle 21.

Figure 4A:
FIGS. 4A to 4E are diagrams to explain examples of the shapes of the wiper.
Figure 4A:
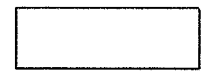
Figure 4B:
Figure 4B:
Figure 4C:
Figure 4C:
Figure 4D:
Figure 4D:
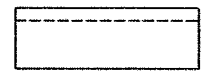
Figure 4E:
Figure 4E:
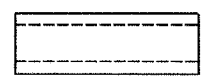

On the other hand, a wiper 6 is attached to the table 5. In addition to directly fixing the wiper 6 to the table 5, the wiper 6 may be fixed to the table 5 using a separate member. Various shapes of the wiper 6 can be adopted. FIG. 4A shows an example in which the wiper 6 has a rectangular section, FIG. 4B shows an example in which the wiper 6 has an oval section, FIG. 4C shows an example in which the wiper 6 has a triangular section, FIG. 4D shows an example in which the wiper 6 has a section in the form of the letter U, and FIG. 4E shows an example in which the wiper 6 has a section in the form of a circular cylinder.

In order to feed a cutting fluid to a working space isolated by a cover 1, a left cutting fluid feeding channel 9 and a right cutting fluid feeding channel 10 are disposed in the working space. A cutting fluid is fed from a cutting fluid supply device (not shown in the figures) to the left cutting fluid feeding channel 9 and the right cutting fluid feeding channel 10 via flow channels (not shown in the figures). A first cutting fluid feeding nozzle 11 and a second cutting fluid feeding nozzle 13 are provided in predetermined places of the left cutting fluid feeding channel 9. A third cutting fluid feeding nozzle 12 and a fourth cutting fluid feeding nozzle 14 are provided in predetermined places of the right cutting fluid feeding channel 10. The cutting fluid is discharged from these first, second, third and fourth cutting fluid feeding nozzles 11, 12, 13 and 14 in predetermined directions in the working space (see arrows 15 in FIGS. 1 and 2).

Figure 1:
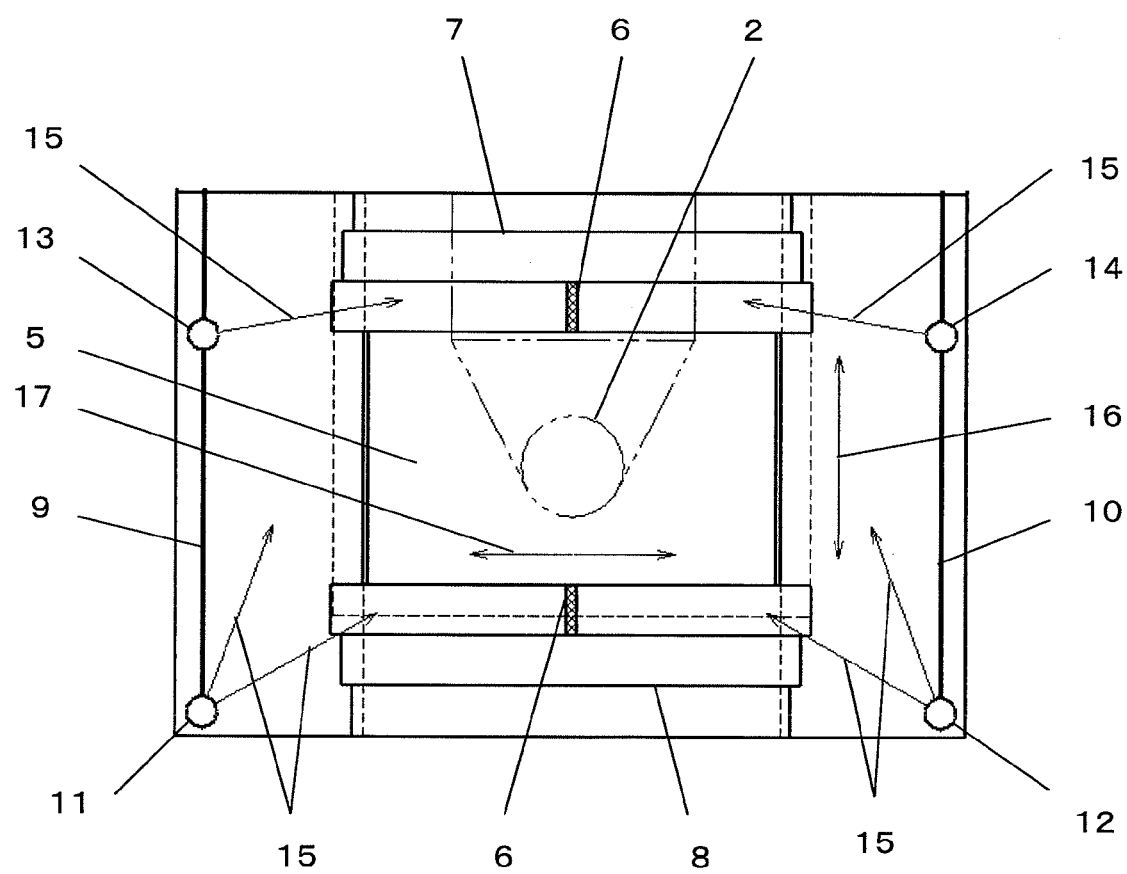
FIG. 1 is a schematic top view of an embodiment of a machine tool of the present invention.

The construction of the machine tool 40 shown in FIGS. 1 and 2 is such that the first and second telescopic covers 7, 8 fixed to the saddle 21 are disposed in the front and rear parts of the table 5 and expands and contracts in the front-rear direction (the first direction denoted by reference numeral 16), and that the table 5 moves in the right-left direction (the second direction denoted by reference numeral 17) with respect to the saddle 21 which has the first and second telescopic covers 7, 8 fixed thereto. The wipers 6, 6 are fixed to the front and rear surfaces of the table 5 (the side surfaces in the first direction).

When the chips 23 generated during the working of the workpiece 4 placed on the table 5 have deposited on the surfaces of the first telescopic cover 7 and the second telescopic cover 8, the wipers 6, 6 fixed to the front and rear surfaces of the table 5 remove the chips 23 deposited on the first telescopic cover 7 and the second telescopic cover 8 by the movement of the table 5 in the right-left direction (the direction of reference numeral 17), causing the chips to fall to the lower part of the cover 1. At the same time, the chips 23 fall from the first telescopic cover 7 and the second telescopic cover 8 by the flows (arrows 15) of the cutting fluid discharged from the right and left cutting fluid feeding channels 9, 10 and the first, second, third and fourth cutting fluid feeding nozzles 11, 12, 13, and 14.

In this manner, the wipers fixed to the front and rear surfaces of the table can reliably and efficiently remove the chips 23 deposited on the first and second telescopic covers 7, 8 at the front and rear of the table 5 with a small sliding resistance, enabling the chips to be recovered in a cutting fluid treatment device (not shown in the figures).

In the case of a construction in which the table 5 moves in the front-rear direction (the first direction vertical to the second direction denoted by reference numeral 17) with respect to the saddle 21, the wipers 6, 6 are fixed to the right and left surfaces (the side surfaces in the second direction) of the table 5.

In the above-described embodiment of the present invention, by using the movement of the table 5, it is possible to frequently remove the chips 23 deposited on the first and second telescopic covers 7, 8 disposed at the front and rear of the table 5 through the use of the wipers 6, 6 fixed to the table 5. Furthermore, because the wipers 6, 6 remove the chips 23 by moving on the first and second telescopic covers 7, 8 in a direction intersecting the expanding and contracting direction (reference numeral 16) of the first and second telescopic covers 7, 8, it is possible to reduce the sliding resistance between the wipers 6, 6 and the first and second telescopic covers 7, 8 during the expansion and contraction of the first and second telescopic covers 7, 8. As a result, the wear due to the sliding of the wipers 6, 6 can be reduced and the chips 23 can be prevented from interfering with the first and second telescopic covers 7, 8, providing improved reliability.

The invention claimed is:

1. A machine tool comprising:
a saddle which is supported by a first guide member provided in a bed and moves relative to the bed in a first direction; and
a table which is supported by a second support member provided in the saddle and moves relative to the saddle in a second direction intersecting the first direction,
the machine tool moving a tool attached to a spindle relative to a workpiece placed on the table to work the workpiece,
wherein the machine tool further comprises a telescopic movable cover which is provided in the saddle and protects the first guide member, and a wiper which is fixed to a side surface of the table in the first direction and removes chips deposited on an outermost portion of the telescopic movable cover.

2. The machine tool according to claim 1, wherein a cutting fluid feeding channel which feeds a cutting fluid is provided on the surface of the telescopic movable cover.

* * * * *